(12) United States Patent
Kiryukhin et al.

(10) Patent No.: US 8,343,773 B2
(45) Date of Patent: Jan. 1, 2013

(54) ARRAY OF MICROCAPSULES FOR CONTROLLED LOADING OF MACROMOLECULES, NANOPARTICLES AND OTHER NANOSCALE ITEMS AND A METHOD OF FABRICATING IT

(75) Inventors: Maxim V. Kiryukhin, Singapore (SG); Maria N. Antipina, Singapore (SG); Karen Chong, Singapore (SG); Hong Yee Low, Singapore (SG); Gleb B. Sukhorukov, Singapore (SG)

(73) Assignee: Agency for Science, Technology and Research, Connexis (SG)

( * ) Notice: Subject to any disclaimer, the term of this patent is extended or adjusted under 35 U.S.C. 154(b) by 336 days.

(21) Appl. No.: 12/395,334

(22) Filed: Feb. 27, 2009

(65) Prior Publication Data

US 2009/0298712 A1 Dec. 3, 2009

Related U.S. Application Data

(60) Provisional application No. 61/057,137, filed on May 29, 2008.

(51) Int. Cl.
*G01N 33/00* (2006.01)
(52) U.S. Cl. ......... 436/94; 427/213.3; 264/4.1; 264/4.3; 264/4.32; 264/4.6
(58) Field of Classification Search ............ 436/94; 427/213.3; 264/4.1, 4.3, 4.32, 4.6
See application file for complete search history.

(56) References Cited

U.S. PATENT DOCUMENTS

2005/0058603 A1* 3/2005 Gao et al. ............ 424/9.32

* cited by examiner

*Primary Examiner* — Jill Warden
*Assistant Examiner* — Monique Cole
(74) *Attorney, Agent, or Firm* — Kilpatrick Townsend & Stockton LLP (57) ABSTRACT

The invention provides a microcapsule array comprising a plurality of microcapsules immobilized on a surface, optionally in microwells in said surface. Each of the microcapsules comprises an outer layer or shell defining a microcapsule interior, said outer layer having a permeability towards a nanoscale species which is dependent on an environmental condition to which said array is exposed.

17 Claims, 3 Drawing Sheets

ARRAY OF MICROCAPSULES FOR CONTROLLED LOADING OF MACROMOLECULES, NANOPARTICLES AND OTHER NANOSCALE ITEMS AND A METHOD OF FABRICATING IT

CROSS-REFERENCE TO RELATED APPLICATIONS

This application claims priority from co-pending U.S. Provisional Patent Application No. 61/057,137, filed May 29, 2008, the disclosure of which is herein incorporated by reference.

TECHNICAL FIELD

The present invention relates to an array of microcapsules for controlled loading of macromolecules, nanoparticles and other nanoscale items, and a method of fabricating same.

BACKGROUND OF THE INVENTION

A major task in the development of advanced drug formulations deals with the elaboration of delivering systems providing sustained release of bioactive materials. Mostly, these delivering systems comprise polymer particles in the size range of 0.1-100 µm. The drug molecules are embedded in polymer matrices or in core-shell structures. In the latter the shell degradation rate determines the release rate of the bioactive core material.

Recently, a novel type of shell structure constituting polymer capsules has been introduced. These novel hollow polymeric capsules have a predetermined size in the sub-micron and micron range and tunable wall properties. These capsules are fabricated by means of layer-by-layer (LbL) assembling of polyelectrolytes onto colloidal particles with subsequent removal of the colloidal core. The layer-by-layer (LbL) assembling is performed by alternating adsorption of oppositely charged species, such as polyelectrolytes onto the surface of colloidal particles. The driving force for LbL adsorption is the electrostatic attraction between the incoming polymer and the surface. It was established that the capsule walls have semipermeable properties. They are permeable for small molecules such as dyes and ions while they exclude compounds with a higher molecular weight.

State of the art also includes systems having controllable or adjustable loading as well as release properties, which allows the loading or release of materials into and from capsules by modifying the capsule wall permeability via variations in environmental conditions.

Lab-on-a-chip (LOC) concept is now widely applicable to chemical and biological detection, analysis and reaction. Current state of the art involves immobilization of host molecule(s) onto a substrate in a predetermined pattern, where patterned and functionalized colloidal particles used greatly enhances the detection efficiency and sensitivity.

OBJECT OF THE INVENTION

An object of the present invention is to allow active molecules (cargo) or other species to be stored in bio-friendly environment, where the microcapsule shells provide additional protection to (environment) sensitive contents.

Another object of the present invention is to preserve the native conformation of biomolecules, since there is no binding between the active molecules (cargo) and the microcapsule, hence issues of conformation distortion which might arise in the case of attachment of biomolecules to conventional colloidal particle systems are overcome.

Another object of the present invention is to provide a microdepot platform which is reversible, where the active molecules (cargo) can be unloaded, and be replaced with another set of new active molecule (cargo).

Another object of the present invention is to allow patterning of different types of cargo within the same array.

It will be understood that not all aspects and embodiments of the invention are intended to satisfy all of the above objects.

SUMMARY OF THE INVENTION

The present invention provides a novel method to form an array of capsules for controlled loading of macromolecules, nanoparticles and other nanoscale items, and a method of fabricating same.

In a first aspect of the invention there is provided an array comprising hollow microcapsules on a patterned substrate, which can act as microdepots for controlled loading and unloading of its content.

The microcapsules are preferably obtained from core-shell particles, where the shell is preferably made from polyelectrolyte multilayer. The core may be dissolved to obtain a hollow cavity for loading of new content, and said shell may thereby possess reversible permeability which can be opened and closed for loading and unloading of its content depending on environmental conditions. The environmental conditions may include pH, temperature, ionic strength, ultrasound, light, solvent.

The microcapsules may be used for patterning of different types of content within the same array.

The microcapsules may be reused for loading of other content upon washing.

The content may include macromolecules, biomolecules, nanoparticles and other nanoscale items.

The substrate is preferably patterned by nanoimprint lithography, but can also be patterned by photolithography, e-beam lithography or other lithography techniques.

In a second aspect of the invention there is provided a process of fabricating an array comprising microcapsules on a patterned substrate, which can act as microdepots for controlled loading and unloading of its content, the process comprising:
patterning of a substrate to form micro-wells,
trapping of core-shell particles inside the micro-wells,
dissolution of core of the particles to form hollow cavities,
varying environmental conditions to open, and close shells for loading and unloading of its content.

The step of patterning may comprise imprint lithography.

In a third aspect of the invention there is provided a microcapsule array comprising:
a surface, and
a plurality of microcapsules immobilised on the surface, wherein each of said microcapsules comprises an outer layer, e.g. a shell, defining a microcapsule interior. The outer layer may have a permeability towards a nanoscale species which is dependent on an environmental condition to which said array is exposed.

The following options may be used in conjunction with the third aspect, either individually or in any suitable combination.

The microcapsules may be coupled to the surface. They may be patterned on the surface. The coupling may be a non-covalent coupling. It may be a physical coupling. It may be a physico-chemical coupling. It may be an electrostatic coupling.

The surface may comprise a plurality of microwells. It may comprise a pattern of microwells. The microwells may be disposed in an array or pattern. They may be disposed in a regular array or regular pattern. Each of the microcapsules may be located at least partially within one of the microwells. The size (e.g. mean diameter) of the microwells may match the size (e.g. mean diameter) of the microcapsules. The sizes of the microwells and of the microcapsules may be comparable or approximately the same. There may be no more than a 10% difference between the size (e.g. diameter) of a microwell and the size (e.g. minimum or maximum or mean diameter) of the microcapsule at least partially located therein, or no more than about a 20%, 30%, 40% or 50% difference. The surface may be a polymeric surface. It may have low surface energy. It may have a surface energy of less than about 30 mJ/m$^2$. The polymer of the polymeric surface may be a low surface energy polymer. It may have a surface energy of less than about 30 mJ/m$^2$.

The outer layers of the microcapsules may comprise at least one functional polymer. The outer layers may each comprise a plurality of polymer layers. Alternate polymer layers may comprise a cationic polymer and an anionic polymer.

The microcapsule interiors may contain core particles which are removable from the microcapsule interiors. The core particles may comprise, or consist essentially of, a core material which is dissolvable or degradable so as to remove the core particles from the microcapsules. The microcapsule interiors may be hollow. The nanoscale species may be located in the microcapsule interiors.

The nanoscale species may be a macromolecular species. It may be a nanoparticulate species. It may be a biomolecular species. It may be a protein, an oligopeptide, a DNA fragment, DNA, an RNA fragment, RNA, an antibody or an antibody fragment, or may be a combination of any two or more of these.

The environmental condition may be selected from the group consisting of pH, temperature, ionic strength, ultrasound, light, presence or concentration of a solvent and concentration of a trigger compound.

In an embodiment there is provided a microcapsule array comprising:
 a polymeric surface comprising a plurality of microwells, and
 a plurality of microcapsules immobilised on the surface, each of said microcapsules being located at least partially within one of the microwells,
wherein each of said microcapsules comprises an outer layer, e.g. a shell, defining a microcapsule interior, said shell having a pH dependent permeability towards a nanoscale species and said shell comprising alternating layers of cationic and anionic polymers.

In a fourth aspect of the invention there is provided a process for making a microcapsule array comprising:
 forming outer layers, e.g. shells, on the surfaces of a plurality of core particles to form a plurality of microcapsules, each of said microcapsules comprising an outer layer defining a microcapsule interior and said microcapsule interior having one of the core particles therein; and
 locating at least some of the microcapsules on a surface;
wherein the outer layers have a permeability towards a nanoscale species which is dependent on an environmental condition to which said array is exposed.

The following options may be used in conjunction with the fourth aspect, either individually or in any suitable combination.

The process may comprise the step of making the surface. The surface may comprise a plurality of microwells, in which case the process may comprise the step of forming the microwells. The step of forming the microwells may comprise imprint lithography. The imprint lithography may comprise the steps of heating a polymer film above its glass transition or melting temperature, applying a mold under pressure to said polymer film, cooling said polymer film to a temperature below its glass transition or melting temperature, releasing the pressure, demolding the polymer film and optionally plasma etching the microwells.

The surface may comprise a plurality of microwells whereby the step of locating locates at least some of the microcapsules each at least partially within one of the microwells. The locating may comprise adsorbing. It may comprise coupling. The coupling may be a non-covalent coupling. It may be a physical coupling. It may be a physicochemical coupling. It may be an electrostatic coupling. It may comprise applying a dispersion (e.g. a slurry) of the microcapsules in a solvent to the surface and evaporating the solvent. The step of evaporating may be conducted slowly, e.g. over at least 10 hours, or over at least one day. The step of locating may comprise template-assisted self-assembly of microcapsules comprising a core particles and a shell, i.e. deposition of a slurry of said microcapsules onto the surface having microwells therein and slow evaporation of solvent thus positioning at least some of microcapsules each at least partially within one of the microwells.

The step of forming the outer layers comprises layer-by-layer deposition comprising alternately exposing the core particles to solutions of a cationic polymer and of an anionic polymer.

The process may comprise the further step of removing the core particles from at least some of the microcapsules to form hollow microcapsules. The removing may comprise dissolving or degrading the core particles (i.e. a core material of which the core particles are comprised).

The process may comprise the step of loading the nanoscale species into microcapsule interiors, said microcapsule interiors being defined by the outer layers of the hollow microcapsules. The step of loading may comprise adjusting the environmental condition so as to render the outer layers permeable to the nanoscale species and exposing the hollow microcapsules to the nanoscale species, optionally to a solution or dispersion thereof. The process may comprise the step of adjusting the environmental condition so as to render the outer layers impermeable to the nanoscale species after the step of loading the nanoscale species into the microcapsule interiors.

The environmental condition may be selected from the group consisting of pH, temperature, ionic strength, ultrasound, light, presence or concentration of a solvent and concentration of a trigger compound.

In an embodiment there is provided a process for making a microcapsule array comprising:
 layer-by-layer deposition comprising alternately exposing the core particles to solutions of a cationic polymer and of an anionic polymer so as to form shells on the surfaces of a plurality of core particles, said shells defining microcapsule interiors, thereby forming a plurality of microcapsules having the core particles in the microcapsule interiors thereof;
 locating the microcapsules on a surface, said surface comprising a plurality of microwells and said locating comprising adsorbing at least some of said microcapsules at least partially within one of the microwells; and removing the core particles from the microcapsule interiors of the microcapsules on the surface to form hollow microcapsules;

wherein the shells have a permeability towards a nanoscale species which is dependent on an environmental condition to which said array is exposed.

In another embodiment there is provided a process for making a microcapsule array comprising:

layer-by-layer deposition comprising alternately exposing the core particles to solutions of a cationic polymer and of an anionic polymer so as to form shells on the surfaces of a plurality of core particles, thereby forming a plurality of microcapsules wherein the shells have a permeability towards a nanoscale species which is dependent on an environmental condition to which said array is exposed, and said shells defining microcapsule interiors;

adsorbing at least some of the microcapsules to a surface, said surface comprising a plurality of microwells and said adsorbing comprising adsorbing each of said microcapsules at least partially within one of the microwells;

dissolving or degrading the core particles so as to remove the core particles from the microcapsule interiors of the microcapsules on the surface to form hollow microcapsules; and adjusting the environmental condition so as to render the shells permeable to the nanoscale species and exposing the hollow microcapsules to the nanoscale species so as to load the nanoscale species into the microcapsule interiors.

In a fifth aspect of the invention there is provided a method for releasing a nanoscale species from a microcapsule array, said microcapsule array comprising a surface, and a plurality of microcapsules immobilised, optionally adsorbed, on the surface, wherein each of said microcapsules comprises an outer layer defining a microcapsule interior, said outer layer having a permeability towards the nanoscale species which is dependent on an environmental condition to which said array is exposed and wherein the nanoscale species is (are) located in the microcapsule interior, said method comprising adjusting the environmental condition so as to render the outer layers permeable to the nanoscale species and exposing the hollow microcapsules to a fluid capable of releasing the nanoscale species from the microcapsules.

In a sixth aspect of the invention there is provided use of a microcapsule array for delivering a nanoscale species to a fluid, said microcapsule array comprising a surface, and a plurality of microcapsules immobilised, optionally adsorbed, on the surface, wherein each of said microcapsules comprises an outer layer, e.g. shell, defining a microcapsule interior, said outer layer having a permeability towards the nanoscale species which is dependent on an environmental condition to which said array is exposed and wherein the nanoscale species is (are) located in the microcapsule interior.

In a seventh aspect of the invention there is provided a method for catalysing reaction of a starting material to a product, said method comprising:

providing a microcapsule array comprising a surface, and a plurality of microcapsules immobilised, optionally adsorbed, on the surface, wherein each of said microcapsules comprises an outer layer, e.g. shell, defining a microcapsule interior, said outer layer having a permeability towards a nanoscale catalyst which is dependent on an environmental condition to which said array is exposed, and wherein the catalyst is located in the microcapsule interior, and wherein the catalyst is capable of catalysing reaction of the starting material to the product; and exposing said array to the starting material, wherein the environmental condition is such that the outer layer is permeable to the starting material and is impermeable towards the catalyst.

The catalyst may be a biomolecular catalyst. It may be an enzyme. It may be a protein. The environmental condition may be such that the outer layer is permeable to the product. The starting material and the product may each, independently, be small molecules. They may have a molecular weight less than about 10 kDa, or less than about 5 kDa or less than about 1 kDa. The catalyst may have a molecular weight greater than about 30 kDa, or at least about 50 kDa or at least about 70 kDa. The starting material and the product may each, independently, be in solution.

In an eighth aspect of the invention there is provided a sensor comprising a microcapsule array according to either the first or the third aspect as described above. The sensor may be a test strip. It may comprise a detector species. The detector species may be disposed (optionally immobilised) in the interior of the microcapsules, or in and or on the outer layers of the microcapsules, or in some other location.

BRIEF DESCRIPTION OF THE DRAWINGS

A preferred embodiment of the present invention will now be described, by way of an example only, with reference to the accompanying drawings wherein.

DETAILED DESCRIPTION OF THE PREFERRED EMBODIMENTS

The present invention describes a microcapsule array comprising a surface and a plurality of microcapsules immobilised on the surface. They may be reversibly immobilised or may be irreversibly immobilised thereon. The outer layers of the microcapsules are tunably permeable towards a nanoscale species, i.e. the permeability towards the nanoscale species is dependent on an environmental condition to which said array is exposed.

The nanoscale species may be a macromolecular species. It may be a nanoparticulate species. It may be a biomolecular species. It may be a protein, an oligopeptide, a DNA fragment, DNA, an RNA fragment, RNA, an antibody or an antibody fragment, or may be a combination of any two or more of these. It may have a molecular weight greater than about 30 kDa, or greater than about 40, 50, 60, 70, 80, 90, 100, 200, 300, 400, 500, 600, 700, 800, 900 or 1000 kDa, or about 30 to about 1000 kDa, or about 30 to 500, 30 to 100, 30 to 50, 50 to 1000, 100 to 1000, 200 to 1000, 500 to 1000, 50 to 500, 50 to 100, 100 to 500 or 200 to 500 kDa, e.g. about 30, 40, 50, 60, 70, 80, 90, 100, 150, 200, 250, 300, 350, 400, 450, 500, 550, 600, 650, 700, 750, 800, 850, 900, 950 or 1000 kDa.

The environmental condition may be any suitable condition that is capable of varying the permeability of the outer layers towards the nanoscale species. It may for example be pH, temperature, ionic strength, ultrasound, light, presence or concentration of a solvent or concentration of a trigger compound. In the latter case, the outer layers may comprise surface groups capable of interacting with the trigger compound so as to vary the permeability of the outer layers towards the nanoscale species. A preferred environmental condition is pH. Thus the permeability of the outer layers towards the nanoscale species may be greater above a threshold pH and lower below the threshold pH, or may be lower above the threshold pH and higher below the threshold pH. The threshold pH may for example be between about 2 and about 10, depending on the nature of the outer layers, or may be between about 3 and 10, 5 and 10, 7 and 10, 3 and 7, 3 and 5, 4 and 8 or 6 and 8, e.g. about 2, 2.5, 3, 3.5, 4, 4.5, 5, 5.5, 6, 6.5, 7, 7.5, 8, 8.5, 9, 9.5 or 10.

The surface may comprise (i.e. define) a plurality of microwells. The microwells may be indentations. They may depressions. They may be hollows. They may be recesses. The microwells may be cylindrical. They may be hemispherical. They may have a round cross section or a square cross section or a polygonal cross section or an irregular cross section or some other type of cross section. The diameter (or mean diameter, or length of a side) of the wells may be about 0.5 to about 100 microns, or about 1 to 100, 10 to 100, 50 to 100, 0.5 to 50, 0.5 to 10, 0.5 to 5, 0.5 to 1, 1 to 50, 1 to 20, 1 to 10 or 10 to 50 microns, e.g. about 0.5, 1, 1.5, 2, 2.5, 3, 3.5, 4, 4.5, 5, 6, 7, 8, 9, 10, 15, 20, 25, 30, 35, 40, 45, 50, 60, 70, 80, 90 or 100 microns. The depth of the microwells may be about 0.5 to about 100 microns, or about 1 to 100, 10 to 100, 50 to 100, 0.5 to 50, 0.5 to 10, 0.5 to 5, 0.5 to 1, 1 to 50, 1 to 20, 1 to 10 or 10 to 50 microns, e.g. about 0.5, 1, 1.5, 2, 2.5, 3, 3.5, 4, 4.5, 5, 6, 7, 8, 9, 10, 15, 20, 25, 30, 35, 40, 45, 50, 60, 70, 80, 90 or 100 microns. The diameter to depth ratio may be about 0.5 to about 5 (i.e. about 1:2 to about 5:1), or about 1 to 5, 2 to 5, 0.5 to 2, 0.5 to 1 or 1 to 2, e.g. about 0.5, 0.6, 0.7, 0.8, 0.9, 1, 1.5, 2, 2.5, 3, 3.5, 4, 4.5 or 5. The surface may be a polymer surface. The polymer may be a low surface energy polymer. Low surface energy reduces the adhesive properties of the surface, so that microcapsules are less able to adsorb onto the bare surface between microwells. Inside a microwell, the contact area between the surface and the microcapsule may be at least 5 times higher than on a flat surface: 4 walls and the bottom surface. This may improve adhesion between the surface of the microcapsule and the microwell relative to the flat surface due to an increase in area of adhesion. It is thought that adhesion may be due in part to a "keying in" effect which physically constrains the microcapsules in the microwells. For comparison, the lowest surface energy is a FDTS (perfluorodecyltrichlorosilane)-treated surface—11.8 mJ/m$^2$; surface energy of PTFE—20 mJ/m$^2$, ETFE—23 mJ/m$^2$, polyethylene—34 mJ/m$^2$, melamine formaldehyde (MF)—40 mJ/m$^2$, polystyrene (PS)—40.7 mJ/m$^2$, PMMA—41 mJ/m$^2$, polyethyleneterephthalate (PET)—45 mJ/m$^2$, silica—115 mJ/m$^2$, alumina—about 500 mJ/m$^2$. Poor adhesion occurs when a substrate has significantly lower surface energy than the material of particles, and good adhesion occurs if substrate has significantly higher surface energy than material of particles. So MF particles will not stick to ETFE surface, can stick to PMMA surface and will easily stick to silica or alumina surface. On the other hand silica particles will not stick to either ETFE or PMMA. The polymer of the surface in the present invention may for example be a fluoropolymer or a fluorocopolymer, e.g. ethylene tetrafluoroethylene copolymer (ETFE). The surface may be a low energy surface. It may have a surface energy equal to or less than that of ETFE. The polymer may be formed, or disposed, on a substrate. The substrate may be an inorganic substrate. It may be a semiconductor substrate. It may be a silicon substrate. The polymer may be free-standing, i.e. it may be not disposed on a substrate. The surface energy of the polymer, or of the surface, may be less than about 30 mJ/m$^2$, or less than about 25, 20 or 15 mJ/m$^2$, or may be about 10 to about 30 mJ/m$^2$, or about 10 to 25, 10 to 20, 15 to 30, 20 to 30, 25 to 30 or 20 to 25 mJ/m$^2$, e.g. about 10, 15, 20, 25 or 30 mJ/m$^2$.

The microwells may be arranged in a regular array. It may for example be a rectangular array, a pentangular array or a circular array, or may be some other shaped array (e.g. trapezoidal). There may be between about 1 and about $10^8$ microwells per mm$^2$, or about 100 to $10^7$, 100 to $10^6$, 100 to $10^5$, 100 to $10^4$, 100 to 1000, 1000 to $10^8$, $10^5$ to $10^8$, 1000 to $10^6$, 1000 to $10^5$ or $10^4$ to $10^6$, e.g. about 100, 200, 300, 400, 500, 600, 700, 800, 900, 1000, 2000, 3000, 4000, 5000, 6000, 7000, 8000, 9000, $10^4$, $5 \times 10^4$, $10^5$, $5 \times 10^5$, $10^6$, $5 \times 10^6$, $10^7$, $5 \times 10^7$ or $10^8$ microwells per mm$^2$ in the array. Each microwell may contain one microcapsule, or there may be some microwells having no microcapsule. In some embodiments at least about 70% of the microwells contain one microcapsule, or at least about 80, 85, 90, 95, 96, 97, 98 or 99%. About 70 to about 100% of the microwells may contain one microcapsule, or about 70 to 98, 70 to 90, 70 to 80, 80 to 100, 80 to 98, 80 to 90, 90 to 100, 90 to 98, 90 to 95, 95 to 100, 95 to 98 or 98 to 100%, e.g. about 70, 75, 80, 85, 90, 95, 96, 97, 98, 99 or 100%. There may be no more than one microcapsule in any microwell. The size of the microwells may match, or be comparable to, that of the microcapsules. The ratio between the diameter (e.g. mean diameter) of the microcapsules and the diameter (e.g. mean or maximum diameter) of the microwells may be about 0.5 to about 1.5 (i.e. about 1:2 to about 3:2), or about 0.5 to 1.3, 0.5 to 1.2, 0.5 to 1.1, 0.5 to 1, 0.7 to 1.5, 0.7 to 1.3, 0.7 to 1.1, 0.9 to 1.5, 0.9 to 1.3 or 0.9 to 1.1, e.g. about 0.5, 0.6, 0.7, 0.8, 0.9, 1, 1.1, 1.2, 1.3, 1.4 or 1.5. If the size of microcapsules exceeds the size of microwell by more than 50% trapping may be ineffective. If microwells are significantly larger than the microcapsules, five-point contact between the microcapsule and microwell walls is ineffective, and may be reduced to one-point contact. This approaches adsorption of microcapsules on a surface having no microwells. Moreover, electrostatic repulsion between neighboring capsules may prevent their dense packaging and favour their escape from the surface to the solution bulk.

The microwells may be made by a method employing e-beam lithography, nanoimprint (nanoprint) lithography, photolithography or some other suitable lithographic technique. In order to make the microwells, a convenient method is to initially prepare a mold having a plurality of protuberances. The protuberances may be approximately the same dimensions as the desired microwells or may be smaller than the desired microwells. The mold may be made of silicon, quartz, nickel or some other suitable material. This may be prepared by e-beam lithography or some other suitable method. The mold is then pushed into a sheet of the polymer, optionally by locating the polymer between a flat solid surface and the mold and applying pressure and/or heat thereto so as to imprint the polymer. The pressure may be at least about 10 bar, or at least about 20, 30, 40, 50 or 60 bar, or about 10 to 100, 20 to 100, 40 to 100, 60 to 100, 10 to 80, 10 to 60, 40 to 80 or 50 to 70 bar, e.g. about 10, 20, 30, 40, 50, 60, 70, 80, 90 or 100 bar. The imprinting temperature should be higher than the glass transition or melting temperature or other relaxation temperature of the polymer. It may be at least about 20° C. higher, or at least about 30, 40 or 50° C. higher, or about 20 to about 100° C. higher, or about 10 to 50, 50 to 100 or 40 to 80° C. higher, e.g. about 30, 40, 50, 60, 70, 80, 90 or 100° C. higher. The imprinting temperature should be sufficiently low to avoid substantial degradation of the polymer over the time used for the imprinting. The time for the fabrication/imprinting may be about 5 to about 60 minutes, or about 10 to 40, 10 to 20, 20 to 60, 40 to 60 or 10 to 30 minutes, e.g. about 10, 15, 20, 25, 30, 35, 40, 45, 50, 55 or 60 minutes. The method may comprise varying one or more of the controlled conditions (e.g. pressure, temperature) during imprinting. The time, temperature and pressure used may depend on the nature of the polymer, and may be different for different polymers. Following the imprinting, the temperature of the polymer, or of the mold, may be reduced to a desired mold release temperature. The mold release temperature should be lower than the glass transition or other relaxation temperature, or melting temperature of the polymer. It may be at least about 40° C. lower, or at least about 50, 60, 70, 80, 90 or 100° C. lower. It may be about 40, 50, 60, 70, 80, 90 or 100° C. lower. It may for example be room temperature or near room temperature. The time, temperature and pressure may be sufficient for the formation of the microwells to occur. The temperature and/or time may be sufficiently low as to avoid substantial degradation of the polymer. The sheet of polymer must be at least as large as the desired array. It may be at least as large as the mold. It may be approximately the same size as the mold or it may be larger than the mold. It may be square, rectangular, circular or some other desired shape. It may be about 0.1 to about 20 cm on a side or it may be of any other desired size. It may for example be about 0.1 to 10, 0.1 to 5, 0.1 to 2, 0.1 to 1, 1 to 20, 50 to 20, 10 to 20, 1 to 10, 1 to 5 or 0.5 to 5 cm on a side, e.g. about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 or 20 cm on a side. The thickness of the sheet of polymer may be greater than the desired depth of the microwells. It must be greater than the length of the protuberances of the mold. The sheet must be thick enough to provide sufficient mechanical strength to the film. It should be sufficiently thick that the protuberances of the mold do not break during the imprinting process. It may be about 10 to about 200 microns, or thicker. It may be for example about 10 to 100, 10 to 50, 10 to 20, 20 to 200, 50 to 200, 100 to 200, 20 to 50 or 50 to 100 microns thick, or about 10, 12, 15, 20, 25, 30, 35, 40, 45, 50, 60, 70, 80, 90, 100, 110, 120, 130, 140, 150, 160, 170, 180, 190 or 200 microns thick. Following formation of the microwells in the polymer sheet the sheet may be treated. It may be treated so as to adjust, e.g. increase, the size of the microwells. It may be treated so as to adjust or improve the properties of the polymer sheet, e.g. to increase its wettability. It may be treated so as to increase the surface energy within the microwells. It may be treated by reactive ion etching (RIE) using a plasma, e.g. an oxygen-$CF_4$ plasma. Suitable conditions include 40 W, 300 Torr, RIE Trion. It may be treated for about 5 s or less to about 1 hour or more. It may be treated for about 1 to about 5000 seconds, or about 5 to 5000, 10 to 5000, 100 to 5000, 500 to 5000, 1000 to 5000, 1 to 1000, 1 to 500, 1 to 100, 1 to 50, 1 to 20, 1 to 10, 5 to 1000, 5 to 500, 5 to 100, 10 to 500, 10 to 100, 100 to 500 or 50 to 500 seconds, e.g. about 1, 2, 3, 4, 5, 6, 7, 8, 9, 10, 15, 20, 25, 30, 35, 40, 45, 50, 60, 70, 80, 90, 100, 150, 200, 250, 300, 350, 400, 450, 500, 600, 700, 800, 900, 1000, 1500, 2000, 2500, 3000, 3500, 4000, 4500 or 5000 seconds or on occasions may be treated for longer than 5000 seconds. This may increase the diameter of the microwells by about few nanometers to few microns. The diameter of the microwells generally increases linearly with plasma exposure time. Thus the percentage increase for a given plasma exposure time (under the same plasma conditions) will vary depending on the diameter of the microwells, and may be from a few percent to several thousands of percent. The mold may be reused in subsequent fabrications.

The microcapsules may be spherical or approximately spherical or distorted spherical (e.g. ovoid, ellipsoid, oblate spherical, collapsed spheres etc.) or may be polyhedral (e.g. dodecahedral, tetradecahetral, icosahedral etc.) or may be some other shape. They may have a diameter (or maximum diameter, or mean diameter) of about 0.5 to about 100 microns, or about 1 to 100, 10 to 100, 50 to 100, 0.5 to 50, 0.5 to 10, 0.5 to 5, 0.5 to 1, 1 to 50, 1 to 20, 1 to 10 or 10 to 50 microns, e.g. about 0.5, 1, 1.5, 2, 2.5, 3, 3.5, 4, 4.5, 5, 6, 7, 8, 9, 10, 15, 20, 25, 30, 35, 40, 45, 50, 60, 70, 80, 90 or 100 microns The microcapsules comprise an outer layer, e.g. a shell, which surrounds, and defines, a microcapsule interior. The outer layer may have a thickness of about 2 to about 1000 nm, or about 2 to about 100 nm, 2 to 50, 2 to 20, 2 to 10, 10 to 1000, 100 to 1000, 500 to 1000, 10 to 100, 100 to 500, 10 to 50 or 50 to 500 nm, e.g. about 2, 3, 4, 5, 6, 7, 8, 9, 10, 15, 20, 25, 30, 35, 40, 45, 50, 60, 70, 80, 90, 100, 150, 200, 250, 300, 400, 500, 600, 700, 800, 900 or 1000 nm. The outer layer may be a polymeric shell. It may be a layered shell. It may have 2 to about 40 layers, or about 2 to 20, 2 to 10, 2 to 5, 5 to 40, 10 to 40, 20 to 40, 5 to 20 or 5 to 10 layers, e.g. about 2, 3, 4, 5, 6, 7, 8, 9, 10, 15, 20, 25, 30, 35 or 40 layers. It may be a layered polymeric shell. It may comprise functional groups that are sensitive to changes in the environmental condition which modulates the permeability of the outer layer towards the nanoscale species. For example if the environmental condition is pH, then the functional groups may be pH sensitive groups, e.g. acidic groups or basic groups. In one embodiment the outer layer comprises, alternatingly, cationic layers and anionic layers, e.g. cationic polymeric layers and anionic polymeric layers. Thus the outer layer may be capable of switching according to the environmental condition between an "open" (i.e. permeable to both low molecular weight and the nanoscale species) and a "closed" (i.e. impermeable to the nanoscale species) state. In the closed state the outer layer may still be permeable to low molecular weight species. Suitable anionic polymers include polyacids such as polyphosphoric acids, polyphosphonic acids, polycarboxylic acids, polysulfuric acids, polysulfonic acids, and others. Examples of corresponding salts, which may also be used, are polyphosphates, polyphosphonates, polysulfates, polysulfonates, and polycarboxylates and others. Suitable salts include sodium and potassium salts. Suitable cationic polymers include polybases such as polyimines, polyamines and polypyridines and others and their corresponding salts. Suitable salts include halides (e.g. bromides, chlorides), nitrates etc. Polyelectrolytes suitable according to the invention are both biopolymers such as, for example, alginic acid, gum arabic, nucleic acids, pectins, proteins and others, and chemically modified biopolymers such as, for example, ionic or ionizable polysaccharides, for example carboxymethylcellulose, chitosan and chitosan sulfate, ligninsulfonates, and synthetic polymers such as, for example, polystyrenesulfonic acid, polymethacrylic acid, polyvinylphosphonic acid, poly-allylamine, and polyethyleneimine and others. It is possible to employ linear or branched polyelectrolytes. A further possibility is to employ amphiphilic polyelectrolytes, for example amphiphilic block or random copolymers containing acidic or basic units on the one hand, and hydrophobic units on the other hand, such as styrenes, dienes or siloxanes etc., which can be arranged as blocks or randomly distributed over the polymer. The polymer(s) of the outer layer may (each independently) have a molecular weight of about 10 to about 500 kDa, or 10 to about 200, 10 to 100, 10 to 50, 50 to 500, 100 to 500, 200 to 500, 20 to 200, 20 to 100, 20 to 50, 50 to 100 or 100 to 300 kDa, e.g. about 10, 20, 30, 40, 50, 60, 70, 80, 90, 100, 150, 200, 250, 300, 350, 400, 450 or 500 kDa.

The outer layer may be permeable under all conditions to low molecular weight species. The low molecular weight species may for example be those with molecular weights less than about weight less than about 10 kDa, or less than about 9, 8, 7, 6, 5, 4, 3, 2 or 1 kDa. It may be permeable only under suitable environmental conditions to high molecular weight species or nanoscale species (as described earlier), e.g. species having a molecular weight greater than about 30 kDa, or at least 50 kDa or at least 70 kDa. It may therefore in one set of environmental conditions be selectively permeable towards low molecular weight species and under a different set of environmental conditions be permeable to low and high molecular weight species. It may be tunably permeable.

In order to make the microcapsules, the polymer may be laid down or deposited on core particles of a suitable size. It will be recognised that the microcapsules will be slightly larger in diameter and of similar shape to the core particles, and that the microcapsule interiors will be approximately the same size as and of similar shape to the core particles. The core particles (and correspondingly the interiors and the microcapsules) may be spherical or approximately spherical or distorted spherical (e.g. ovoid, ellipsoid, oblate spherical, collapsed spherical etc.) or may be polyhedral (e.g. dodecahedral, tetradecahetral, icosahedral etc.) or may be some other shape. They may have a diameter (or maximum diameter, or mean diameter) of about 0.5 to about 100 microns, or about 1 to 100, 10 to 100, 50 to 100, 0.5 to 50, 0.5 to 10, 0.5 to 5, 0.5 to 1, 1 to 50, 1 to 20, 1 to 1 or 10 to 50 microns, e.g. about 0.5, 1, 1.5, 2, 2.5, 3, 3.5, 4, 4.5, 5, 6, 7, 8, 9, 10, 15, 20, 25, 30, 35, 40, 45, 50, 60, 70, 80, 90 or 100 microns. The core particles may comprise (or consist essentially of) a core material which is removable from the microcapsule interiors so as to remove the core particles from the microcapsule interiors. The core particles may be removable by means of dissolving the core material in a suitable solvent and allowing the resulting solution to pass out through the outer layer. This may require adjusting the environmental condition so as to render the outer layer permeable to the dissolved core material. The core material may be degradable to form degradation products which are capable of exiting the microparticle interiors of the microparticles through the outer layers. This may optionally also require adjusting the environmental condition so as to render the outer layer permeable to the degradation products, although in some cases the degradation products may have molecular weights sufficiently small to allow them to exit through the outer layer without adjustment of the environmental condition. The degrading may comprise complexing (e.g. chelation of an insoluble inorganic species in order to render it soluble) or hydrolysis or some other form of degradation. Examples of suitable core materials include melamine formaldehyde polymer, or calcium carbonate, or cadmium carbonate or other water insoluble carbonates, which may be degraded and/or dissolved in acidic conditions, or polystyrene, which may be dissolved in water-miscible organic solvents and may penetrate out of the outer layer, or silica, which may be dissolved in HF. The step of laying down the polymer may comprise a layer-by-layer (LbL) method. In this method, the core particles are exposed to a solution of a first charged polymer. They are then centrifuged or filtered out and washed to remove unadsorbed first charged polymer. They are then exposed to a solution of an oppositely charged polymer and again centrifuged or filtered out and washed, so as to remove unadsorbed oppositely charged polymer. This sequence is repeated a suitable number of times in order to generate the desired number of layers. The solutions of the polymers may be, independently, about 1 to about 10 mg/ml, or about 1 to 5, 1 to 2, 2 to 10, 5 to 10 or 2 to 5 mg/ml, e.g. about 1, 2, 3, 4, 5, 6, 7, 8, 9 or 10 mg/ml. The solvent may be an aqueous solvent. It may be water. It may comprise an electrolyte. It may comprise a salt, e.g. sodium chloride. The concentration of the salt may be about 0.1 to about 1N, or about 0.1 to 0.5, 0.5 to 1 or 0.3 to 0.7N, e.g. about 0.1, 0.2, 0.3, 0.4, 0.5, 0.6, 0.7, 0.8, 0.9 or 1N. The particles may be provided as a dispersion, e.g. suspension or slurry, in this process. They may be present at about 1 to about 0.1 to about 10% w/v, or about 0.1 to 5, 0.1 to 2, 0.1 to 1, 1 to 10, 2 to 10, 5 to 10, 0.5 to 5 or 1 to 5% w/v, e.g. about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9 or 10% w/v. The dispersion may be aqueous. It may comprise water. It may comprise a salt or electrolyte as discussed above. The above described process may be conducted at about 10 to about 30° C., or about 10 to 20, 20 to 30 or 15 to 25° C., e.g. about 10, 15, 20, 25 or 30° C. It may be conducted at room temperature. It may be conducted at some other suitable temperature.

A microcapsule array according to the present invention may be made by exposing the surface (as described above) to the microcapsules having the core particles in the interiors thereof. The core particles may then be removed from the microcapsule interiors as described above, in order to provide a microcapsule array in which the microcapsules are hollow. In the context of the present invention, the term "hollow" does not imply that there is no material therein. It should be taken to signify that the microcapsule interiors do not contain substantial quantities (preferably contain substantially none) of the core material and also do not contain substantial quantities (preferably contain substantially none) of the nanosized substance. The hollow microcapsules may have a solvent in the microcapsule interiors. The solvent may be an aqueous solvent. It may be water. It may be an aqueous solution. It may have a pH between about 2 and about 10 or between about 3 and 10, 5 and 10, 7 and 10, 3 and 7, 3 and 5, 4 and 8 or 6 and 8, e.g. about 2, 2.5, 3, 3.5, 4, 4.5, 5, 5.5, 6, 6.5, 7, 7.5, 8, 8.5, 9, 9.5 or 10.

The step of locating the microcapsules (having core particles located in their interiors) may be accomplished by exposing the surface (optionally with imprinted microwells) to a dispersion (e.g. suspension or slurry) of the microcapsules. The dispersion may be in a solvent, e.g. an aqueous solvent. The solvent may then be allowed to dry. It is preferable to retard the drying. This may be accomplished by restricting air (or other gas) flow to the suspension on the surface, or by controlling the gas phase concentration of the solvent (e.g. the humidity) above the dispersion on the surface, or by controlling the temperature at a relatively low value, or by a combination of these, or by some other method. Suitably the drying should take more than about 10 hours, or more than about 1 day, or more than about 2, 3, 4 or 5 days. It may take 10 hours to 5 days, or 10 hours to 2 days, 10 to 20 hours, 1 to 5 days, 1 to 2 days or 2 to 5 days, e.g. about 10, 15 or 20 hours or 1, 2, 3, 4 or 5 days. Excess microcapsules that are not firmly adsorbed on the surface, e.g. inside the microwells, may be removed by washing with a suitable solvent, e.g. aqueous solvent, or by physical means or by some other process. The above steps may be repeated one or more times (e.g. 2, 3, 4, 5, 6, 7, 8, 9 or 10 times) in order to increase the number of microcapsules adsorbed on the surface (optionally within microwells).

In order to remove the core particles from the interiors of the microcapsules, the microcapsules may be exposed to conditions under which the core material either dissolves or degrades, and under conditions under which the dissolved core material or the degradation products is (are) capable of exiting the interiors of the microparticles through the outer layer of the microparticles. In the case where the core material is dissolved, this may comprise conditions under which the outer layer is permeable to high molecular weight species. In the case where the core material is degraded, the degradation products may be sufficiently small to exit the interiors of the microcapsules under all conditions. Thus for example if the core material is a soluble polymer and the microcapsules are permeable to high molecular weight species only at pH below about 5, the core may be removed by exposing the microcapsules (e.g. on the surface or in the microwells) to a solvent for the soluble polymer at pH below 5. The microcapsules may be washed for a period of time with the solvent. This may result in hollow microcapsules on the surface of the array (e.g. in the microwells). In another example, if the core material is degradable in acid, exposing the microcapsules (e.g. on the surface or in the microwells) to a suitably acidic solution may degrade the core material to low molecular weight degradation products which can exit the interiors of the microcapsules. The microcapsules may be washed either with the acidic solution or with some other solvent capable of dissolving the degradation products.

In order to load the nanoscale species into the microcapsules it is of course first necessary to remove the core particles from the interiors of the microcapsules, as described above. This results in an array having hollow microcapsules on the surface (optionally in the microwells). A nanoscale species may then be loaded into the interiors of the microcapsules. This may be achieved by exposing the hollow microcapsules (i.e. the array) to the nanoscale species, for example to a solution or microemulsion of the nanoscale species, under an environmental condition under which the outer layers of the microcapsules are permeable to the nanoscale species (or to high molecular weight species in general). This may for example comprise washing the microcapsules with a solution of the nanoscale species, or at least partially immersing the microcapsules in a solution of the nanoscale species. The exposing may be for sufficient time for the nanoscale species to penetrate into the interiors of the microcapsules. The microcapsules (i.e. the array) may then be exposed to environmental conditions under which the outer layers of the microcapsules are impermeable to the nanoscale species (or to high molecular weight species in general). This may serve to prevent the nanoscale species from exiting from the interiors of the nanocapsules. If the resulting array, having the nanoscale species in the interiors of the microcapsules, is exposed to an environmental condition under which the outer layers of the microcapsules are permeable to the nanoscale species (or to high molecular weight species in general), the nanoscale species may be at least partially, optionally substantially completely, removed from the interiors of the microcapsules to regenerate substantially hollow microcapsules having little or substantially no nanoscale species. The resulting array may then be loaded (using a similar method to that described above) with a second nanoscale species, resulting in an array in which the second nanoscale species (but little or substantially none of the initial nanoscale species) is located in the interiors of the microcapsules. Thus the loading of the nanoscale species may be reversible. The microcapsules (and hence the array) may be loadable. They (it) may be reloadable. In the event that the nanoscale species comprises nanoparticles, these may be generated in the interior of the microcapsules. Thus, for example, an array having hollow microcapsules on the surface may be exposed to a first reagent under an environmental condition where the outer layers of the microcapsules are permeable to the first reagent, so as to load the first reagent into the interiors of the microcapsules. The resulting microcapsules may then be exposed to a second reagent under an environmental condition where the outer layers of the microcapsules are permeable to the second reagent, said second reagent being capable of reacting with the first reagent so as to form the nanoparticles. This may lead to formation of the nanoparticles in the interiors of the microcapsules. The resulting loaded array may be washed so as to remove unreacted first and second reagent, and also nanoparticles formed outside the microcapsules. One or both of the first and second reagent may have high molecular weight, and may therefore require a specific environmental condition to penetrate the outer layers of the microcapsules. One or both of the first and second reagent may have low molecular weight, and may therefore be capable of penetrating the outer layers of the microcapsules under all environmental conditions. In a particular example, a soluble polymer is loaded into the interiors of hollow microcapsules in an array as described above, and is locked into the interiors by suitably adjusting the environmental condition (e.g. pH). The resulting array having the soluble polymer in the interiors of the microcapsules is then exposed to a low molecular weight crosslinker for the soluble polymer. This can penetrate the outer layers of the microcapsules and crosslink the polymer so as to form the nanoparticles in the interiors of the microcapsules.

In some embodiments of the invention the array comprises more than one (e.g. 2, 3, 4 or 5) type of microcapsule. These may vary according to size or to the nature of the core material or to the nature of the nanoscale species in the interiors or to the nature of the outer layer or according to more than one of these. In one example an array may be made in which two different types of microcapsule are present which vary according to the core material. In an embodiment, the core materials of the different types of microcapsule may be removed selectively, i.e. one may be removed without removing the other. For example if one type of microcapsule has a melamine formaldehyde (MF) core in its interor and another type of microcapsule has a polystyrene core in its interior, the polystyrene core may be removed by exposure to an organic solvent, for example tetrahydrofuran, toluene, chloroform or dioxane, which dissolves polystyrene but does not dissolve MF. This would generate an array in which some microcapsules are hollow and others have MF core particles in the interiors therof. Conversely, the MF core particles may be removed by degrading in a reagent which does not degrade or dissolve polystyrene, e.g. 0.1N HCl. This would generate an array in which some microcapsules are hollow and others have polystyrene core particles in the interiors thereof. An array in which some of the microcapsules are hollow and some have core particles in the interiors therof may be loaded with a first nanoscale species as described earlier. As only the hollow microcapsules would be loaded with the first nanoscale species, this would result in an array in which some of the microcapsules have the nanoscale species in the interior thereof and others have a core in the interior thereof. Removal of the core particles and subsequent loading with a second nanoscale species would then lead to an array in which some of the microcapsules have the first nanoscale species in the interior thereof and others have the second nanoscale species in the interior thereof. Such arrays may be useful in multisensory applications or in smart lab-on-a-chip devices, where, for example, different microcapsules could produce or decompose different materials.

The arrays of the present invention may be used to deliver the nanoscale species to a fluid. Thus exposure of an array according to the present invention in which the nanoscale species is located in the interiors of the microcapsules to an environmental condition suitable to render the outer layers of the microcapsules permeable to the nanoscale species may serve to release the nanoscale species from the microcapsules. For example if the outer layers are permeable to the nanoscale species at pH below about 5, then exposure of an array having a nanoscale species in the interiors of the microcapsules to 0.1N HCl would allow the nanoscale species to be released, whereas exposure of such an array to, for example, a basic solution would allow the nanoscale species to be retained in the array. In the case of a pH sensitive outer layer, the threshold pH for permeability towards the nanoscale species may depend on the nature of the polymer(s) used to make the outer layer, in particular, if they are charged polymers, their $pK_a$s.

An array according to the present invention may be used to catalyse reaction of a starting material to a product. Thus for example, if the microcapsules of the array have an enzyme in the interiors, and the array is maintained in an environmental condition where the outer layer is impermeable to the enzyme, exposure of the array to a small molecular weight substrate for the enzyme would allow the substrate to penetrate through the outer layer to the enzyme and be converted thereby to a product. Commonly the product will also be a low molecular weight species and will therefore be capable of penetrating through the outer layer and out of the microcapsules. The array may therefore serve to immobilise the enzyme. As the enzyme is not chemically bound but is constrained physically within the microcapsules, the risk of denaturation of the enzyme during immobilisation is sharply reduced.

In some embodiments, the reaction of the starting material to the product may be detectable, e.g. visually or electrically. In this case the array may function as a sensor or detector for the starting material. Thus the present invention also provides a sensor or a detector for a low molecular weight species, said sensor or detector comprising an array as described herein. In the array, the microcapsules may have a catalyst, e.g. enzyme, located (e.g. constrained or immobilised) in the interiors thereof. As described earlier, an array may have different types of microcapsules which vary according to the nanoscale species in the interiors thereof. This may be used in multisensory applications where more than one analyte may be detected, optionally quantified. In some cases the multiple sensing operations may be conducted simultaneously on a single test sample.

The invention also provides a sensor comprising the microcapsule array of the invention. The sensor may comprise a detection means. The detection means may comprise one or more electrodes for detecting an electrochemical reaction occurring inside (i.e. in the interiors of) the microcapsules. The surface of the array may comprise, or may be, an electrode. The detection means may comprise a detector for detecting a product generated within the microcapsules. It may comprise a detector species for detecting a product generated within the microcapsules. The detector species may be located in the interiors of the microcapsules. It may be located in and/or on the outer layers of the microcapsules. It may be located outside the microcapsules. It may be immobilised (either chemically, physicochemically or physically). It may be immobilised in the interiors of the microcapsules, in and/or on the outer layers of the microcapsules, outside the microcapsules or in more than one of these locations. It may be unimmobilised. In the event that the detector species generates a visible signal (e.g. colour change, fluorescence etc.), the sensor may be a test strip for detecting the analyte. The detection means may be, or may comprise, a detector for detecting radiation evolved as a result of a reaction occurring within the microcapsules. The radiation may be visible. It may be UV. It may be IR. It may be fluorescence. It may be phosphorescence. It may comprise more than one of these types of radiation. The invention also provides a method for detecting the presence or absence of an analyte in a liquid, optionally the concentration of an analyte in a liquid, comprising exposing the microcapsule array, or the sensor described above, to the liquid.

In an example, a microcapsule array having an enzyme locate in the interiors of the microcapsules may be used as a detector. In this example, the detector species may be covalently coupled to one or both of the anionic polymer and the cationic polymer used to make the outer layers. Alternatively the detector species may be a low molecular weight species capable of penetrating the outer layers of the microcapsules. The detector species should be a species which can interact with a product generated by reaction of an analyte with the enzyme in such a way that the interaction can be detected. The interaction may for example cause the detector species to fluoresce, or it may cause a change in an IR, UV or visible absorbance of the detector species or it may cause some other detectable change in the detector species. In this way, the presence of the analyte causes the enzyme to produce the product which causes a detectable change in the detector species. For example, if the enzyme is a combination of glucose oxidase (GOD) and peroxidise (POD), an oxidisable detector species may be combined with a test liquid and the microcapsule array exposed to the resulting mixture. If the test liquid comprises glucose, oxidation of glucose catalysed by GOD produces hydrogen peroxide and POD catalyses oxidation of the detector molecule with this hydrogen peroxide. In the event that the detector molecule is Amplex Red, the resulting oxidised species, resorufin, may provide a detectable fluorescence. In the absence of glucose, the above sequence of reactions does not occur, and no fluorescence is observed. In this way the presence or absence of the analyte, in this case glucose, in the test liquid may be detected. Further, by measuring the intensity of the fluorescence, the concentration of the analyte in the test liquid may be determined. Alternatively, if the detector species, e.g. Amplex Red, is immobilised in and/or on the outer layer of the microcapsules, the test liquid may be applied to the microcapsule array without adding the detector species to the test liquid. In this event, the presence of glucose in the test liquid would cause the microcapsules to fluoresce by the same mechanism as described above.

One of the central challenges in nanotechnology is how to realize the controlled design of nanoscale objects distribution on the surface. Herein the inventors disclose a concept that combines advantages of: a) imprint lithography in creating the desired pattern and b) hollow polyelectrolyte microcapsules in controlled loading/unloading of a nanocargo.

In some embodiments, polyelectrolyte capsules are synthesized by Layer-by-Layer deposition of oppositely charged polyelectrolytes onto the surface of colloid particles followed by dissolution of the core. The size of initial particles determines the size of final capsules. It can be varied from 1000 μm to 50 nm. The walls of the capsules possess reversible pH-sensitive permeability for relatively large objects like macromolecules, proteins or nanoparticles. This gives rise to their use for externally controlled loading/unloading of a cargo.

Nanoimprint lithography is a powerful method for high-throughput patterning of nanostructures at great precision and at a low cost. Particularly it can be used for fabrication of hole or grooves arrays in the polymer films. Their width and arrangement depend on the design of the mold.

Polyelectrolyte capsules loaded with desired cargo are effectively trapped inside the holes/grooves of appropriate size. pH changing results in the controlled release of capsules content.

Figure 1:
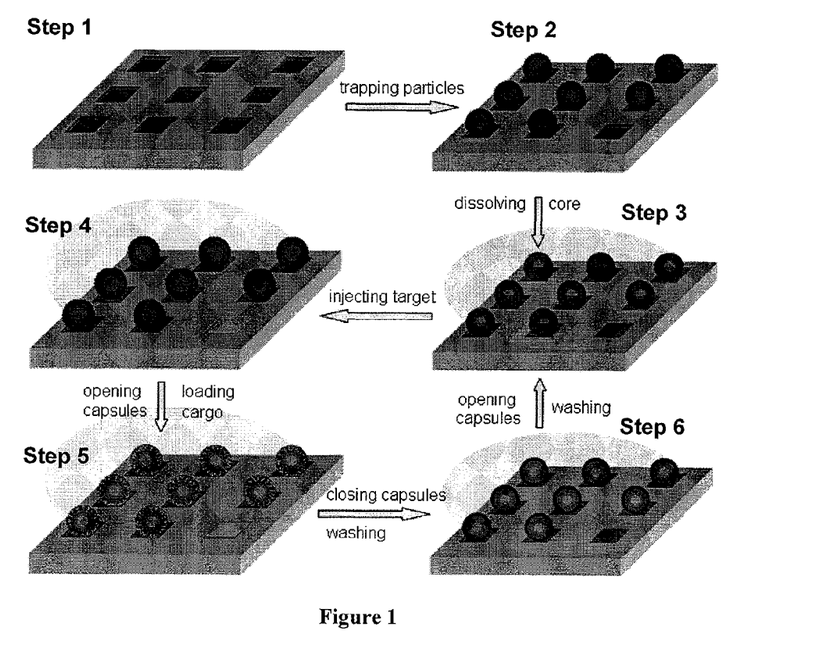
FIG. 1 is a schematic overview of a method used to fabricate the array of microcapsules for controlled loading of macromolecules, nanoparticles and other nanoscale items.

The present invention provides an array of capsules for controlled loading of macromolecules, nanoparticles and other nanoscale items, and a method of fabricating the array. A schematic overview of the process is shown in FIG. 1. An array of micro-well of a desired dimension and arrangement is patterned on the surface of a free standing polymer film via nanoimprint lithography (NIL) (Step 1). Subsequently, colloidal particles covered with polyelectrolyte multilayer (PEM) are trapped inside the micro-wells (Step 2). Dissolution of the core results in formation of hollow PEM capsules (Step 3). Shells of the capsules possess pH sensitive reversible permeability which can be opened and closed for loading and unloading of its content (Steps 4-5). Upon washing, the capsules can be reused for loading of other content (Step 6).

Other objectives and advantages of the invention will become readily apparent from the following examples.

Example 1

A) Experimental Details
(1) Fabrication of the Wells Pattern on the Surface of Polymer Films In this example, pattern was fabricated by nanoimprint lithography. In this technique, the type of imprinted structure depends on mold design. A silicon mold with 1.5 microns square pillars supplied by Kyodo Inc. (Japan) was used. Prior to imprinting, they were cleaned by sonication in acetone for 5 minutes, and further treated in oxygen plasma (100 W, 250 Torr, RIE Trion) for 10 minutes.

Poly(ethylene-co-tetrafluoroethylene) (ETFE) was used as a polymer substrate because of its low surface energy and good mechanical properties. Sheets of 12 microns thickness ETFE film (Asahi Glass Co., Japan) were cut into square pieces of same dimension as the mold (about 1.5 cm). Each piece was placed between the cleaned silicon wafer and mold, and imprinting was carried out on an Obducat imprinter (Obducat Sweden) with the following recipe: 150° C. and 60 bars for 1200 seconds.

The size of resulted square wells was adjusted by oxygen-CF4 plasma treatment (40 W, 300 Torr, RIE Trion).
(2) Fabrication of Core-Shell Particles.

Figure 2:
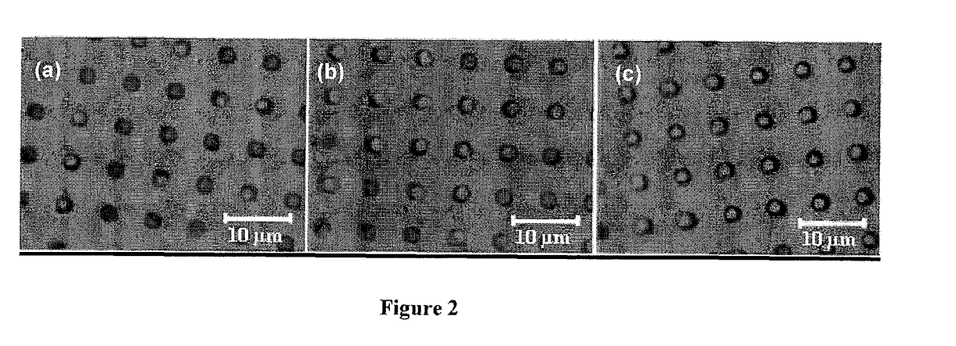
FIG. 2 is optical microscope images of 1.87 μm MF-(PSS/PAH)$_6$PSS particles trapped inside 2.1 μm square holes after (a) 1, (b) 2, and (c) 4 slurry dropping-drying-washing cycles.

Melamine formaldehyde (MF, 1.87 μm in size) and Poly (styrene) (PS, 2.0 μm in size) colloid particles were used as received from microParticles GmbH (Germany) and Duke Scientific Corporation (USA) respectively. Microparticles were covered with PEMs by the layer-by-layer (LbL) assembly of oppositely charged polyelectrolytes. Slurry containing about 2 wt. % of particles was shaken successively with 2 mg/ml poly(styrene sulfonate) (PSS) or 2 mg/ml poly(allylamine hydrochloride) (PAH) solutions containing 0.5M NaCl. Non-adsorbed macromolecules were washed out using the centrifugation technique that followed each adsorption step. The resulted shell consists of 6 (or 6.5 in the case of MF microparticles) polyelectrolyte double layers, and ends with a PSS layer. PEMs shell made around MF and PS core particles was labeled with tetramethylrhodamine isothiocyonate (TRITC) and florescein isothiocyanate (FITC) respectively by introduction PAH-TRITC or PAH-FITC right after the first PSS layer.
(3) Trapping the Core-Shell Particles Inside the Imprinted Micro-Wells A few drops of slurry containing MF (or mixed MF and PS) colloid particles covered with PEMs (core/shell particles) were placed onto the imprinted ETFE film, and covered with Petri dish to make the drying process slower (2-3 days). Subsequently, the film was washed several times with water or cleaned with tissue to remove the untrapped particles. Such deposition cycles were repeated several times.
(4) Fabrication of the Single Type of Hollow Capsules and Their Loading with Macromolecules MF core particles of the trapped core/shell particles were dissolved with 0.1 M HCl solution followed by washing with water. Then 10 mg/ml solution of bovine serum albumine labeled with fluorescein isothiocyanate (FITC-BSA) was dropped onto the top of the film followed by adding 0.1M HCl and washing with excess amounts of water. Low molecular weight fluorescein was also used in some experiments.
(5) Fabrication of the Two Types of Hollow Capsules and Their Loading with Different Macromolecules MF core particles of the core/shell particles were dissolved and capsules were loaded with TRITC-BSA as described above. Then PS core particles of the trapped core/shell particles were dissolved in tetrahydrofuran (THF) followed by washing with water. 10 mg/ml FITC-BSA solution in acetate buffer (pH 5.0) was dropped onto the top of the film followed by washing with excess amounts of water.
B) Results
Single Type of Hollow capsules and Their Loading with Macromolecules 1.5 μm square wells were imprinted on the ETFE film. The size of the wells was further increased to about 2.1 μm by 100 s of RIE etching. Optical microscope images of 1.87 μm MF-PEMs core-shell particles trapped inside those wells are shown in FIG. 2. Their amount continuously increases with the number of deposition cycles, and reaches >98% after 4 cycles. Particles are driven to the wells by both gravity and capillary forces, so slow drying (2-3 days) is essential for this process.

The MF core of the particles is easily dissolved by immersing the film into 0.1M HCl solution, followed by washing with excess amounts of water. It is worth noting that the amount of trapped capsules was practically the same as the number of initial particles, which serves to indicate that the capsules are still effectively trapped inside the wells.

Figure 3:
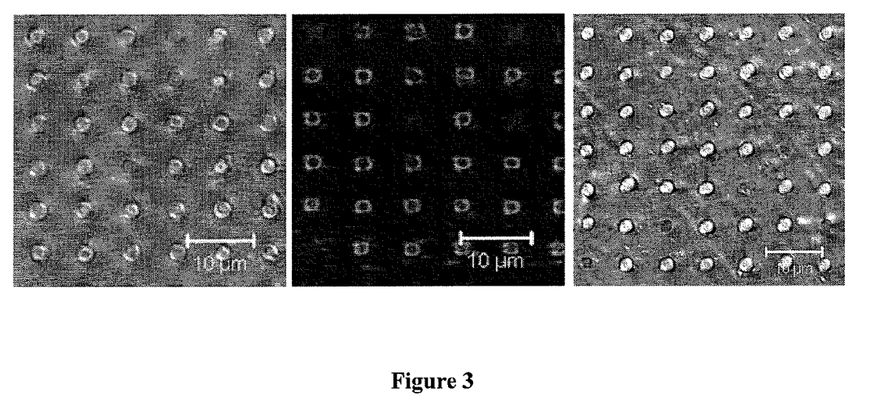
FIG. 3 is superposition of Confocal Laser Scanning Microscopy (CLSM) images of ETFE film with patterned TRITC-labelled microcapsules: (a) after two cycles of core/shell particles depositions onto the substrate, followed by dissolution of the core particles, (b) after introduction of the FITC-BSA, (c) after adding 0.1 M HCL followed by washing with water.

FIG. 3 shows the Confocal Laser Scanning Microscopy (CLSM) image of the ETFE film with patterned (PSS/PAH)$_6$PSS capsules, and their use as microdepots for controlled protein loading. The sample was obtained via two cycles of core/shell particles deposition followed by dissolution of the core. Red circles in FIG. 3(a) are the hollow (PSS/PAH)$_6$PSS capsules labeled with TRITC. This sample was chosen because it contains a few vacant wells hence observations of its behavior contribute to better understanding of the results. Introduction of FITC-BSA to the solution above leads to the filling of empty wells with protein (see green squares in the FIG. 3(b)). However, the protein cannot penetrate to the microcapsule interiors because of effective blockage by capsules' shells. This can be most clearly seen from the image of second capsule in the first row. Because of a dent in the capsule shell, there is free volume in the well which is filled with BSA.

Decrease of pH in the BSA-FITC solution below 5 switches the capsules to 'open' state permeable for high-molecular compounds. Further washing with excess water increases the pH, and makes capsules "closed" again. Simultaneously, BSA is washed out of vacant wells, and only proteins entrapped inside the capsules could be seen at this step (see FIG. 3(c)).

Two Types of Hollow Capsules and Their Loading with Different Macromolecules

Figure 4:
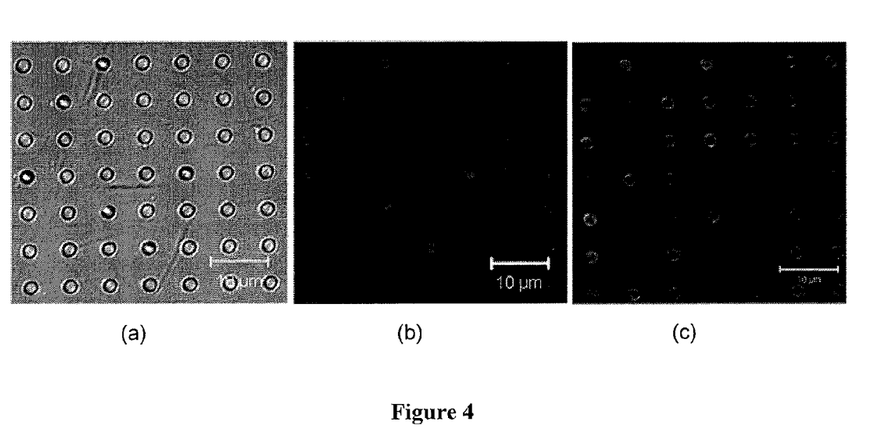
FIG. 4 (a) is a superposition of CLSM images of ETFE film with two types of microcapsules loaded with different molecules; (b) emission of TRITC (red) dye molecules; (c) emission of FITC (green) dye molecules.

If a mixed slurry of core-shell particles with two different types of the core (MF and PS) was used, a random distribution in the microwells was achieved. Treatment the film patterned with microparticles with 0.1M HCl results in selective dissolution of MF core particles and formation the hollow capsules. These were loaded with BSA-TRITC according to the procedure described above. However PS core particles were not dissolved and did not allow BSA loading. Further treatment with THF results in selective dissolution of PS core particles thus making empty hollow capsules co-existing with capsules previously filled with BSA-TRITC. Addition of the BSA-FITC solution in acetate buffer (pH 5.0) results in opening of empty capsules and their loading with this protein. Further washing with water helps to remove excess of protein and to close the capsules. FIG. 4 shows CLSM images of the resulted sample. Exact position of microwells with entrapped capsules of both types as well as vacant microwells can be easily detected from the FIG. 4(a). Red circles in the FIG. 4(b) are the TRITC-BSA macromolecules. They selectively fill capsules made from MF core particles. Green circles in the FIG. 4(b) are the FITC-BSA macromolecules that selectively fill capsules made from PS core particles. Vacant microwells are free from both types of the protein macromolecules.

In comparative experiments, fluorescein was injected above the imprinted film containing hollow capsules. In this case, green dye was detected both in vacant wells and inside the capsules. This demonstrates that capsules shell is fully permeable for the low-molecular compounds.

Thus, each PEM capsule acts as microdepot for loading, storing and release of cargo. BSA protein was used as the cargo in this example, but it may be any protein, macromolecule, nanoparticle or other nanoscale item. The spatial distribution of capsules determines the cargo pattern.

Example 2

A) Experimental Details
Loading of Single Type Hollow Capsules with Enzymes and Performing Reactions Cascade MF core particles of the trapped core/shell particles were dissolved with 0.1M HCl solution followed by washing with water. Mixed solution containing 2 mg·ml$^{-1}$ of glucose oxidase (GOD) and 1 mg·ml$^{-1}$ of peroxidase (POD) in acetic buffer (pH 5) was dropped onto the top of the film followed by washing with excess amounts of water. Finally 50 mM β-D-glucose water solution (pH 7.4) and 15 μM Amplex Red DMSO solution were successively dropped onto the top of the film.

B) Results
Single Type of Hollow Capsules as Patterned Enzymatic Microreactors

Figure 5:
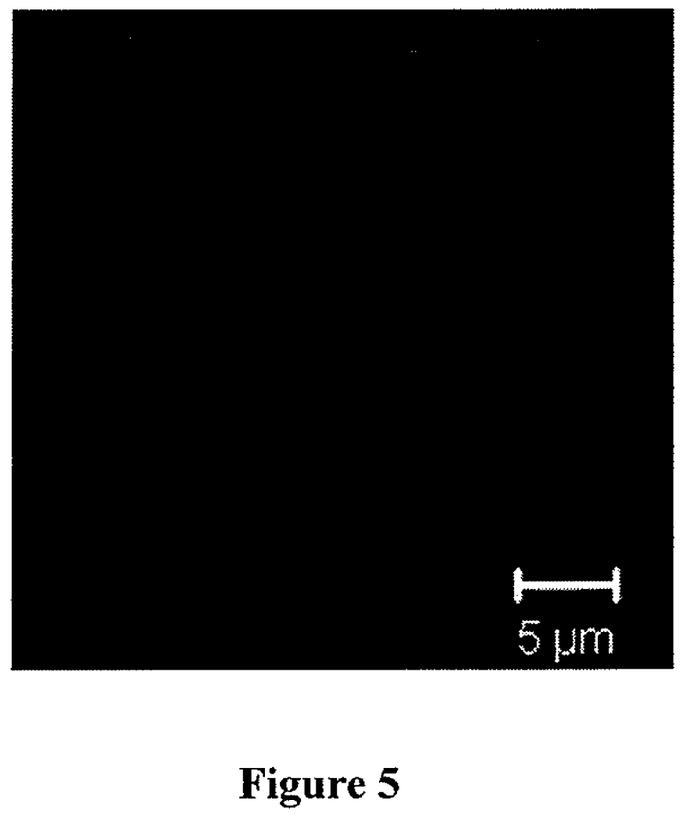
FIG. 5 shows Confocal Laser Scanning Microscopy (CLSM) image of resorufin formation in an array according to the present invention: fluorescence occurs in the interior of the patterned microcapsules, where GOD and POD are located. Capsules shells did not contain fluorescently labelled polymer.

Patterns of single type hollow capsules were obtained as described above. (To ensure that fluorescent signal is coming from the product of enzymatic reactions cascade microcapsules with unlabeled shells were used for this experiment.) In acetate buffer (pH 5) capsules become 'open' for the high-molecular weight compounds, which allowed GOD and POD to penetrate into the interior. Flushing the surface with water results in the increase of pH in the media, the microcapsules return back to the impermeable 'close' state, thus retaining the incorporated enzymes inside. However, small molecules (glucose, $O_2$, Amplex Red) still diffuse freely through the polyelectrolyte shells. Once inside the capsules, the glucose molecules are oxidized in the presence of GOD with the formation of $H_2O_2$. Next, the POD catalyses conversion of Amplex Red into the highly fluorescent resorufin by $H_2O_2$:

(GOD);

In agreement with the above described protocol, the sample does not display any fluorescence before Amplex Red introduction (data not shown). After the introduction, resorufin formation starts immediately and thus the fluorescence occurs in the interior of the patterned microcapsules (see FIG. 5).

The invention claimed is:
1. A process for making a microcapsule array comprising:
   forming outer layers on the surfaces of a plurality of core particles to form a plurality of microcapsules, each of said microcapsules comprising an outer layer defining a microcapsule interior and said microcapsule interior having one of the core particles therein; and
   locating the microcapsules, each having one of the core particles in the microcapsule interior thereof, on a surface;
   removing the core particles from the microcapsules to form hollow microcapsules;
   wherein the outer layers have a permeability towards a nanoscale species which is dependent on an environmental condition to which said array is exposed;
   wherein the surface comprises a plurality of microwells whereby the step of locating locates at least some of the microcapsules, each having one of the core particles in the microcapsule interior thereof, each at least partially within one of the microwells.

2. The process of claim 1 wherein the step of forming the outer layers comprises layer-by-layer deposition comprising alternately exposing the core particles to solutions of a cationic polymer and of an anionic polymer.

3. A process for making a microcapsule array on a surface comprising:
   providing said surface having an array of microwells on a surface thereof; and;
   locating microcapsules at least partially within said microwells;
   wherein said surface is a polymeric surface of low surface energy, and
   wherein each of said microcapsules comprises an outer layer defining a microcapsule interior and having a permeability towards a nanoscale species which is dependent on an environmental condition to which said array is exposed, and
   wherein each microcapsule has a core particle in the microcapsule interior thereof.

4. The process of claim 1 or 3 comprising the step of forming the microwells, said step comprising nanoimprint lithography comprising heating a polymer film above its glass transition or melting temperature, applying a mold under pressure to said polymer film, cooling said polymer film to a temperature below its glass transition or melting temperature, releasing the pressure, demolding the polymer film and plasma etching the microwells.

5. The process of claim 1 or 3 wherein the step of locating comprises applying a dispersion of the microcapsules, each having one of the core particles in the microcapsule interior thereof, in a solvent to the surface and evaporating the solvent.

6. The process of claim 5 comprising the step of loading the nanoscale species into the microcapsule interiors of the hollow microcapsules.

7. The process of claim 6 wherein the step of loading comprises adjusting the environmental condition so as to render the outer layers permeable to the nanoscale species and exposing the hollow microcapsules to the nanoscale species.

8. The process of claim 6 comprising the step of adjusting the environmental condition so as to render the outer layers impermeable to the nanoscale species after the step of loading the nanoscale species into the microcapsule interiors.

9. The process of claim 1 or 3 wherein the environmental condition is selected from the group consisting of pH, temperature, ionic strength, ultrasound, light, presence or concentration of a solvent and concentration of a trigger compound.

10. The process of claim 3 wherein the process of providing said surface having an array of microwells on a surface thereof comprises the step of forming the microwells on said surface.

11. The process of claim 3, comprising the further step of removing the core particles from the microcapsules to form hollow microcapsules.

12. The process of claim 3 wherein the surface is a patterned surface.

13. The process of claim 12 comprising the step of patterning a substrate to form microwells, whereby the resulting substrate comprising the microwells represents the patterned surface.

14. The process of claim 13 wherein the step of patterning comprises imprint lithography.

15. The process of claim 7 wherein the nanoscale species is selected from the group consisting of a protein, an oligopeptide, a DNA fragment, DNA, an RNA fragment, RNA, an antibody and an antibody fragment.

16. The process of claim 10 wherein the step of forming the microwells comprising nanoimprint lithography further comprising heating the surface above its glass transition or melting temperature, applying a mold under pressure to said surface so as to form the microwells, cooling said surface to a temperature below its glass transition or melting temperature, releasing the pressure, demolding the surface and plasma etching the microwells.

17. The process of claim 3 wherein said low surface energy is a surface energy below 30 J/m$^2$.

* * * * *